United States Patent
Shemtov

(10) Patent No.: US 6,808,181 B1
(45) Date of Patent: Oct. 26, 2004

(54) BUSHING AND SEALING RING ASSEMBLY

(76) Inventor: Sami Shemtov, 2518 N. Andrews Ave. Ext., Pompano Beach, FL (US) 33064

(*) Notice: Subject to any disclaimer, the term of this patent is extended or adjusted under 35 U.S.C. 154(b) by 24 days.

(21) Appl. No.: 10/165,057

(22) Filed: Jun. 7, 2002

(51) Int. Cl.$^7$ .............................. F16L 5/02; F16L 21/04; F16L 25/00; F16B 43/02
(52) U.S. Cl. ...................... 277/606; 277/607; 277/609; 277/622; 285/386; 411/542
(58) Field of Search .............................. 277/606–609, 277/613, 616, 622, 602, 603, 620, 621, 623, 624, 626, 628, 630, 637, 644; 285/386–367, 354, 387, 388; 411/542, 533, 371.1, 369, 405, 403, 518

(56) References Cited

U.S. PATENT DOCUMENTS

| | | | | | |
|---|---|---|---|---|---|
| 3,281,155 | A | * | 10/1966 | Kauffman | 277/606 |
| 4,150,845 | A | * | 4/1979 | Riuli et al. | 285/81 |
| 4,258,936 | A | * | 3/1981 | Goldberg | 285/31 |
| 4,877,270 | A | * | 10/1989 | Phillips | 285/18 |
| 5,288,087 | A | * | 2/1994 | Bertoldo | 277/616 |
| 5,378,027 | A | * | 1/1995 | Gehring | 285/322 |
| 5,833,245 | A | * | 11/1998 | Gallagher | 277/549 |
| 5,903,964 | A | * | 5/1999 | Uematsu et al. | 29/456 |
| 6,077,267 | A | * | 6/2000 | Huene | 606/73 |
| 6,102,444 | A | * | 8/2000 | Kozey | 285/79 |
| 6,168,168 | B1 | * | 1/2001 | Brown | 277/637 |
| 6,359,355 | B1 | * | 3/2002 | Hartsfield et al. | 310/89 |
| 6,481,722 | B1 | * | 11/2002 | Shaffer | 277/609 |
| 6,541,720 | B2 | * | 4/2003 | Gerald et al. | 200/51.05 |

* cited by examiner

Primary Examiner—Alison Pickard
Assistant Examiner—Vishal Patel
(74) Attorney, Agent, or Firm—Howard C. Miskin, Esq.; Gloria Tsui-Yip, Esq.

(57) ABSTRACT

A bushing and sealing ring assembly including a sealing ring and a bushing. The sealing ring has a cylindrical base with an external thread and a reduced diameter, upstanding cylindrical sleeve extending co-axially from one end of the base with a predetermined height, an upper outer edge and an upper inner edge. The base and the sleeve are provided with a circular central aperture for receiving and retaining a first cylindrical member. The bushing has a cylindrical depending sidewall with an internal thread and a circular central aperture for receiving the sealing ring and a second cylindrical member and a top plate extending transversely partially inwardly into the central aperture to sealingly receive the upper outer edge of the sealing ring and having a predetermined thickness. The sealing ring is threadably retainable within the cylindrical sidewall abutting the top plate of the bushing to preassemble the sealing ring with respect to the bushing, the predetermined height of the sleeve is greater than the predetermined thickness of the top plate such that the upper outer edge and the upper inner edge of the sleeve protrude beyond the bushing. The sleeve is adapted to engage the first cylindrical member.

21 Claims, 6 Drawing Sheets

BUSHING AND SEALING RING ASSEMBLY

CROSS-REFERENCE TO RELATED APPLICATIONS

Not Applicable.

Field of the Invention

The present invention relates in general to fittings or connectors for conduits, such as pipes, tubes, ducts, and the like and it relates more particularly to bushing assemblies for joining two electrical conduits.

In the transmission of electrical power or electrical signals, it is conventional practice to house the electrical wire or cable in polymeric or metal conduits. When in the ground, the conduit and couplings should resist moisture entering the conduit.

Related Art

Fittings or connectors for electrical wire-carrying conduits are widely used in industrial, commercial, and residential establishments. Some such fittings are used to join two cylindrical members, such as a pair of electrical conduits, in axial alignment. It is important that the members or conduits be assembled and maintained in generally axial alignment Oftentimes, such conduits are in a moisture type atmosphere. Such fittings especially for electrical conduits, need to resist moisture from entering the conduits.

There is also a need for sealably joining members or conduits of different outside diameters, such as, for example, joining a first conduit to a second conduit in which the outside diameter of the second conduit is less than the outside diameter of the first member, and, preferably, less than the inside diameter of the first diameter so that the second conduit can be assembled with the first conduit such that one end of the second conduit is disposed within an end of the first conduit with the two conduits in axial alignment with each other. A bushing and sealing ring for sealing can be used to assemble two conduits. The problem with a sealing ring is that it is a separate part and therefore is subject to being lost or misplaced or broken and, if preinstalled in the bushing, is susceptible to falling out of the bushing or being or becoming misaligned with the bushing.

BRIEF SUMMARY OF THE INVENTION

The present invention provides a sealing ring for sealing and a bushing and sealing ring assembly for sealing that permits the easy assembly of a pair of cylindrical members in generally axial alignment.

The present invention provides a sealing ring for sealing and a bushing and sealing ring assembly for sealing that permits the assembly of a pair of cylindrical members in generally axial alignment with one end of the second member disposed within an end of the first conduit in alignment.

The present invention further provides a sealing ring for sealing and a bushing and sealing ring assembly for sealing that permits the secure preassembly of the sealing ring with the bushing.

The present invention provides a bushing and sealing ring assembly comprising a. a sealing ring
   i. a cylindrical base provided with an external thread
   ii. a reduced diameter, upstanding cylindrical sleeve, the base and the sleeve being provided with a circular central aperture for receiving and retaining a first cylindrical member and
b. a bushing comprising
   i. a cylindrical depending sidewall provided with an internal thread
   ii. a top plate provided with a circular central aperture for receiving and retaining a second cylindrical member.

The sealing ring is threadably retainable in the bushing to preassemble the sealing ring with respect to the bushing. The sleeve engages the first cylindrical member in moisture resistant sealing relationship.

Further, the present invention provides a sealing ring adapted for use in a bushing and sealing ring assembly, the sealing ring comprising i. a cylindrical base provided with an external thread for threadable retention in an internally threaded, centrally apertured bushing and
ii. a reduced diameter, upstanding cylindrical sleeve, the base and the sleeve being provided with a circular central aperture for receiving and retaining a first cylindrical member

DETAILED DESCRIPTION OF THE PREFERRED EMBODIMENTS

Figure 1:
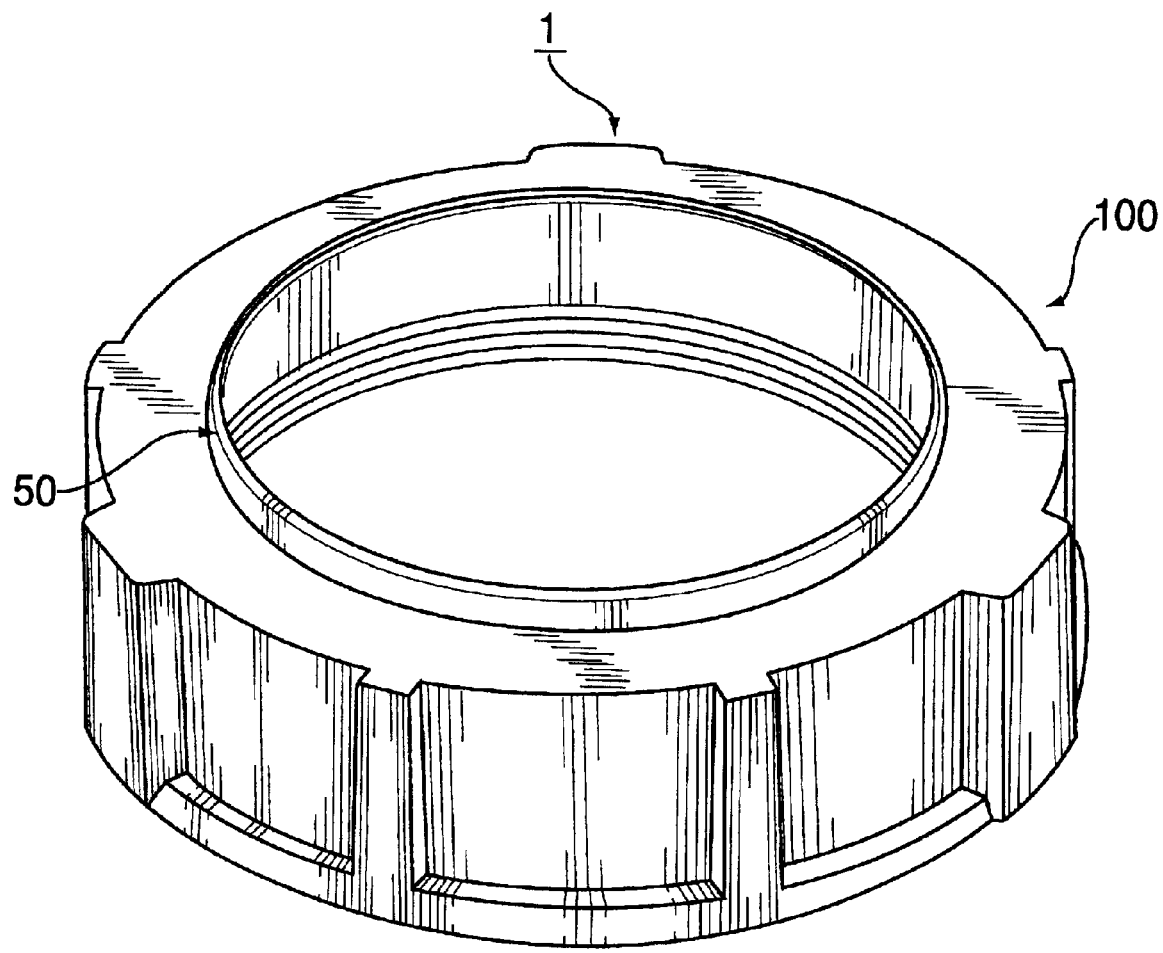
FIG. 1 is a front perspective view of the bushing and sealing ring assembly of the present invention.

Referring now to the drawings that illustrate a preferred embodiment of the present invention as applied to a bushing and sealing ring assembly, reference numeral 1 generally designates the bushing and sealing ring assembly in accordance with the present invention.

The bushing and sealing ring assembly of the present invention comprises an externally threaded sealing ring 50 and an internally threaded bushing 100 for joining two cylindrical members, such as a pair of electrical conduits (not shown), together in generally axial alignment in moisture-resistant sealing relationship. (As used herein, the term "moisture-resistant" means capable of moisture-resistance.) Preferably, the conduit, not shown, is metal and provides a housing for electrical power and/or signal wires or optical signal means. The sealing ring 50 avoids abrasion of such wires and optical signal means.

Figure 2:
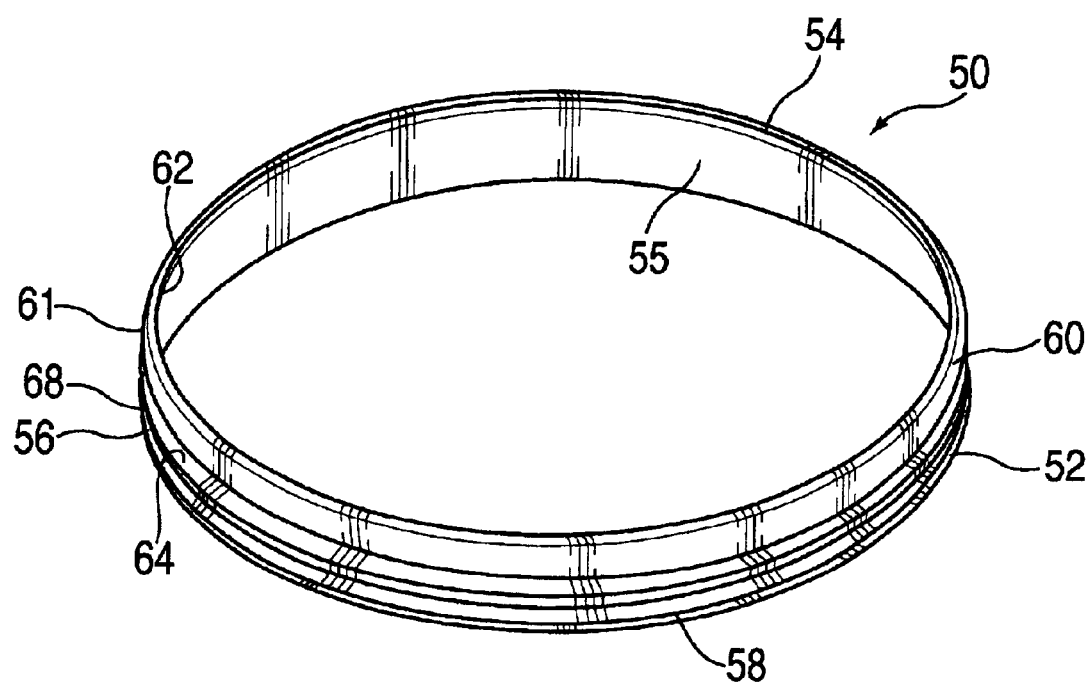
FIG. 2 is a front perspective view of the sealing ring of the present invention.
Figure 4:
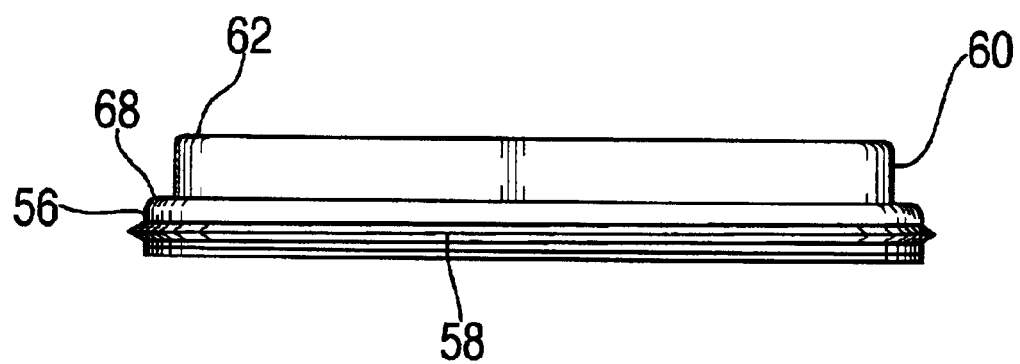
FIG. 4 is a front elevation view of the sealing ring of the present invention.
Figure 6:
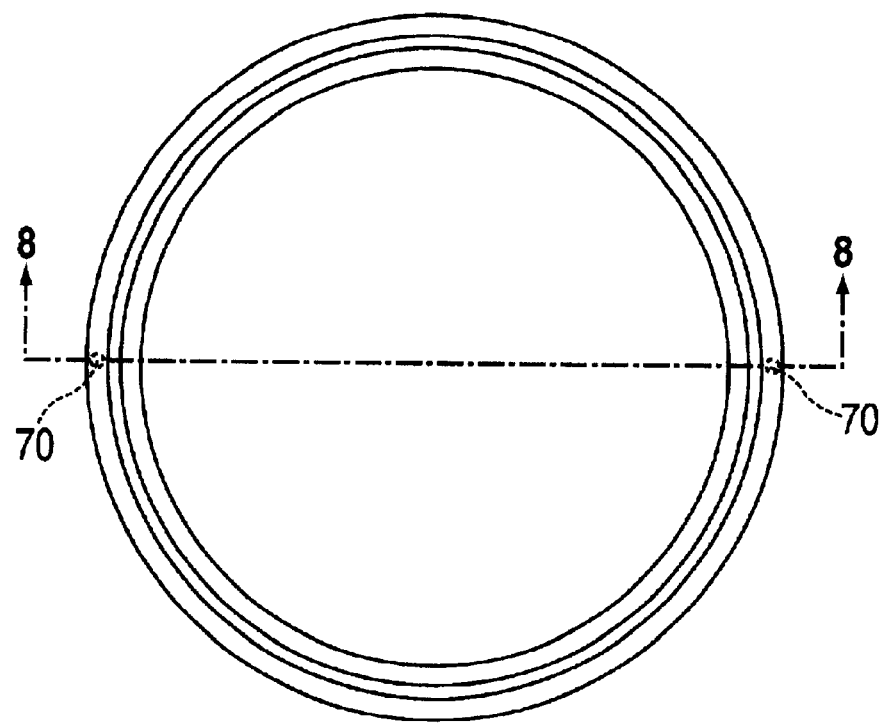
FIG. 6 is a top plan view of the sealing ring of the present invention.
Figure 7:
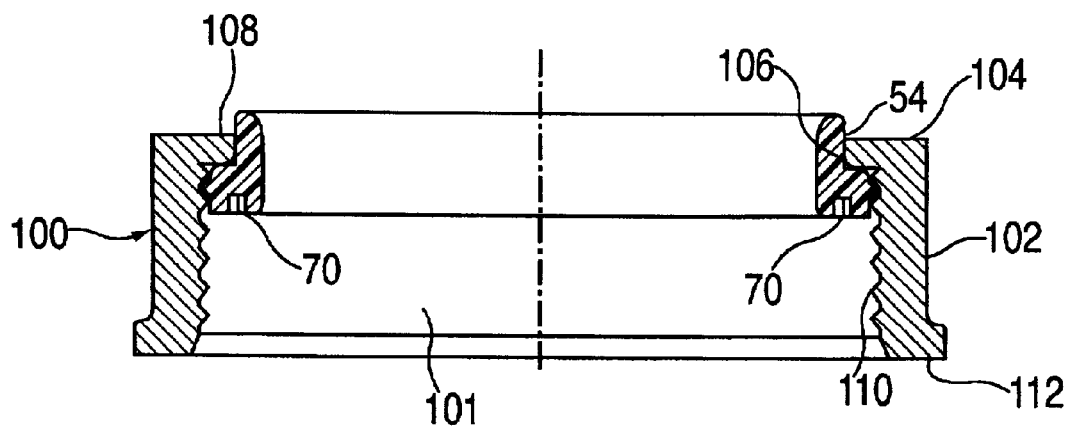
FIG. 7 is a side elevation view, taken in section along line 7—7 of FIG. 5, of the sealing ring assembly of the present invention.
Figure 8:
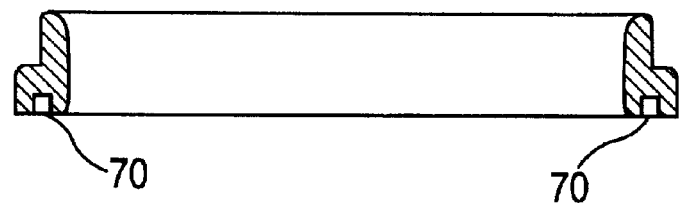
FIG. 8 is a side elevation view of the sealing ring of the present invention.
Figure 9:
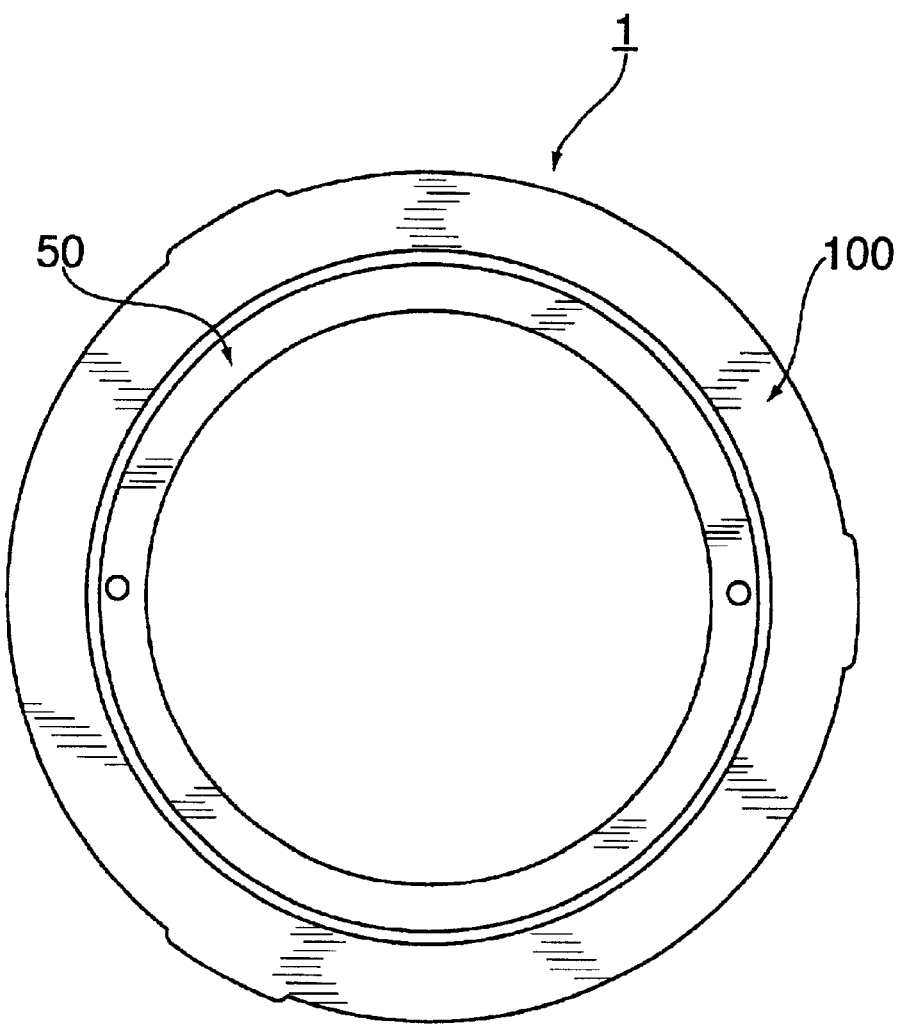
FIG. 9 is a bottom plan view of the sealing ring assembly of the present invention.

As may be seen, for example, from FIGS. 2, 4 and 8, the sealing ring 50, in turn, comprises a cylindrical base 52 and a reduced diameter, upstanding cylindrical sleeve 54 integrally formed with each other with a central aperture 55 extending through the base 52 and sleeve 54 for receiving and retaining a cylindrical member. The sealing ring 50 is electrically insulative and itself moisture-resistant. The outer sidewall 56 of the base 52 is provided with an externally directed helical thread 58 that extends radially outwardly from the base 52 for cooperative engagement with an internal thread of bushing 100. The cylindrical sleeve 54 comprises a reduced-diameter cylindrical extension of the base 52 that is coaxial with the base 52. The upper outer edge 60 of the sleeve 54 is convexly curved as is the upper inner edge 62 of the sleeve for ease in inserting the sealing ring 50 in the bushing 100 and in inserting a conduit in central aperture 55. The juncture of the base 52 and sleeve 54 forms a shoulder 64; the upper outer edge 68 of the shoulder 64 is also convexly curved to reduce binding with the bushing 100. The base 52 may be provided with at least one pair of diametrically opposed cylindrical recesses 70 (FIGS. 6, 7, and 8) in the bottom of the base 52 that extend upwardly in parallel relation to the longitudinal central axis of the sealing ring 50 and the axis of rotation of the sealing ring 50. The recesses 70 permit the installation of the sealing ring 50 into the bushing 100 using a driving tool (not shown) that comprises a pair of spaced apart upstanding pins for insertion into recesses 70 and driving revolution of the pins around the axis of rotation of the sealing ring 50.

Figure 3:
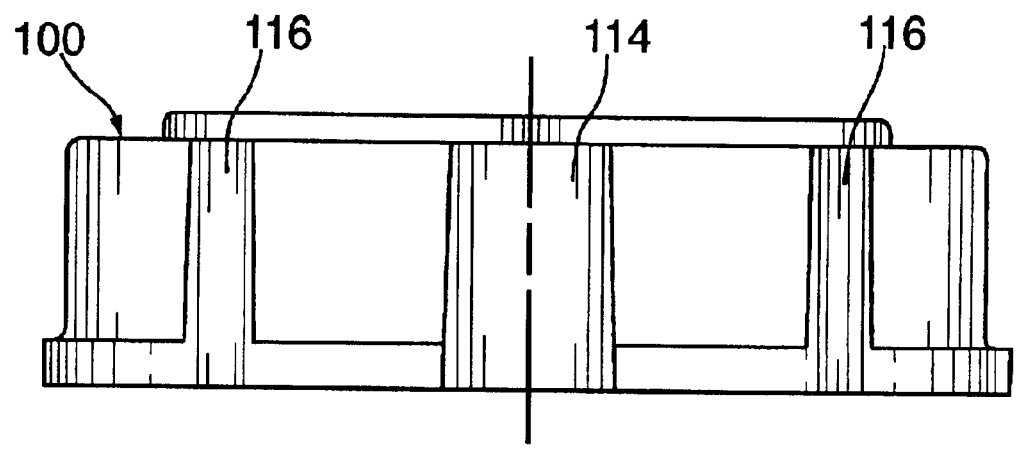
FIG. 3 is a front elevation view of the sealing ring assembly of the present invention.
Figure 5:
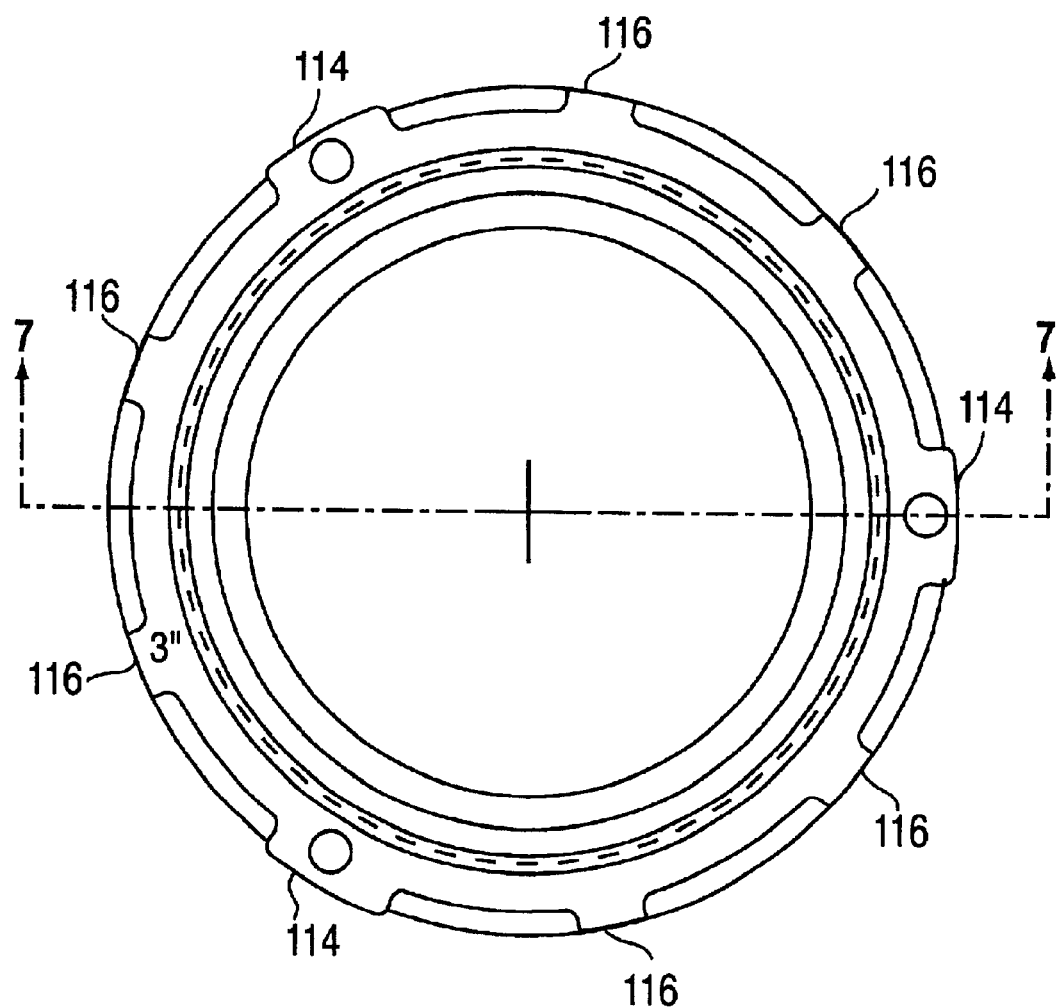
FIG. 5 is a top plan view of the sealing ring assembly of the present invention.

As may be seen from FIGS. 3 and 7, for example, the bushing 100 is provided with a central aperture 101 and comprises a depending cylindrical sidewall 102 and is partially closed at one end by a top, or end, plate 104. The end plate 104 is provided with a reduced diameter, centrally disposed aperture 106, thereby providing the bushing 100 with a radially inwardly directed lip 108 at the upper terminus of the inner surface of the sidewall 102. The inner diameter of the central aperture 106 and the outer diameter of the cylindrical sleeve 54 of the sealing ring 50 are dimensioned to provide a rotational clearance between the lip 108 and the cylindrical sleeve 54. The vertical height of the cylindrical sleeve 54 from the shoulder 64 is greater than the thickness of the lip 108 so that the cylindrical sleeve 54 extends above the end plate 104 when the sealing ring 50 is installed in the bushing 100. The inner surface of sidewall 102 is threaded with a continuous internally directed thread 110 that extends from the plane of the bottom edge of the sidewall 102 to the intersection of the top edge of sidewall 102 with lip 108. The outer surface of sidewall 102 is provided at its bottom edge with an enlarged diameter circumferential base ring 112 that extends outwardly from the sidewall 102. Extending upwardly from the base ring 110 in a vertical direction generally parallel to the longitudinal central axis of the bushing 100 (and the sealing ring 50 when installed in the bushing 100) are a set of major lugs 114 (FIG. 3 and 5) and a set of minor lugs 116. The set of major lugs 114 comprise a plurality of equally circumferentially spaced individual lugs that extend radially outwardly from the external surface of the sidewall 102 farther than the minor lugs 116 and that are arcuately wider than the minor lugs 116. The set of minor lugs 116 comprise a plurality of equally circumferentially spaced individual lugs that extend radially outwardly from the external surface of the sidewall 102, but to a lesser distance than the major lugs 114 and that are arcuately narrower than the major lugs 114. Preferably the lugs 114 and 116 are circumferentially spaced alternately and equally from each other, i.e., in an alternating sequence of major lug 114, minor lug 116, minor lug 116, major tug 114, minor lug 116, minor lug 114, etc., in equal circumferential spacing. The upper ends of the lugs 114 and 116 terminate at the plane of the end plate 104 and their top surfaces are coplanar with the end plate 104.

Figure 10:
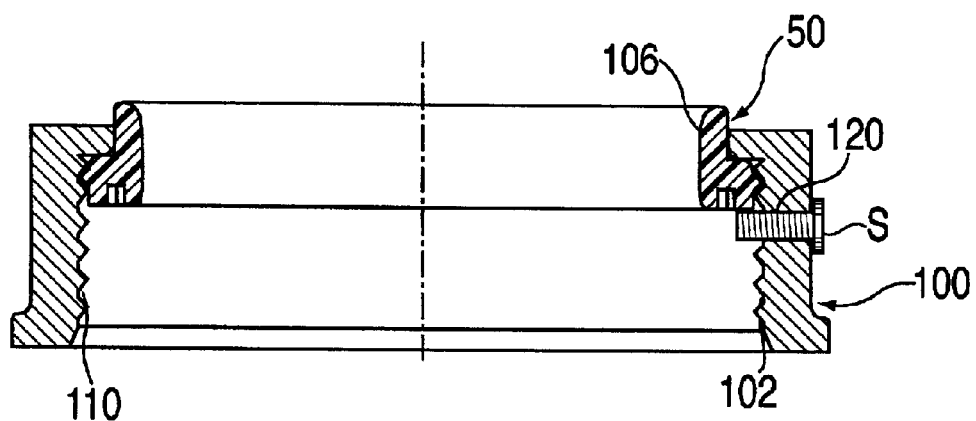
FIG. 10 is a side elevation view, in vertical section, of an alternative embodiment of the present invention.

As illustrated in FIG. 10, in an alternative embodiment of the present invention, the bushing 100 is provided with a threaded aperture 120 and a set screw for retaining the bushing 100 against unthreading disassembly after it has been threaded onto a cylindrical member and, also, for retaining the threaded sealing ring 50 against unthreading disassembly from the bushing 100 when it is preinstalled in the bushing 100. The aperture 120 is internally threaded and extends radially inwardly toward the longitudinal central axis of the threaded inner wall of the base ring 110. It extends through the sidewall 102 from the outer wall to the inner wall.

The sealing ring 50 and bushing 100 are assembled by inserting the upper end of cylindrical sleeve 54 of sealing ring 50 into the open lower end of cylindrical sidewall 102 of bushing 100 and rotatably threading the externally directed thread 58 of sealing ring 50 into the internally directed thread 106 of sidewall 102 causing the sealing ring 50 to rotate about and translate along the longitudinal central axis of the bushing 100 until the shoulder of the sealing ring 50 abuts the undersurface of lip 108. Cooperating thread 58 on the sealing ring 50 and thread 106 on the bushing 100 permit the sealing ring 50 and bushing 100 to be preassembled, if desired, and thereby permit the sealing ring 50 and bushing 100 to be carried, handled and manipulated as an assembly, or unit, rather than as separate parts. As separate parts, they are susceptible to being lost from each other or broken and require that the two parts be assembled and maintained in assembled position at the time the sealing ring 50 and bushing 100 are being used to join or assemble two cylindrical members together as a functional unit in moisture-resistant sealing relation. The upper outer edge 60 of sealing ring 50 is convexly curved to minimize the edge 60 from catching on or fouling with the lower inner edge of the cylindrical sidewall 102 or the internal threads 106 of the bushing 100. The upper outer edge 68 of the outer sidewall of the base 52 is also convexly curved for the same reason. The radius of curvature of the upper inner edge 62, in vertical elevation section, is greater than that of the upper outer edge to 60 facilitate insertion of a cylindrical member, such as an electrical conduit (not shown), into the sleeve 54.

In the use of the bushing and sealing ring assembly 1, the bushing 100, with the sealing ring 50 installed as previously described (FIGS. 1, 3, and 5), is threaded onto a threaded end portion of a cylindrical member (not shown), such as the threaded end of an electrical conduit. Since the external thread 58 of sealing ring 50 is of the same hand as the internal thread 106 of the bushing and, therefore, of the threaded end of the cylindrical member, when the cylindrical member is threaded into the bushing 100 a sufficient distance for the end of the cylindrical member to contact and frictionally engage the bottom of the base 52 of the sealing ring 50 the further rotation of the cylindrical member with respect to the bushing 100 will drive the sealing ring 50 until the top surface of shoulder 64 of the base 52 abuts the bottom surface of lip 108. In this fully installed position, the top edge of the cylindrical sleeve 54 extends above the top surface of the end plate 104. A second cylindrical member (not shown), such as an electrical conduit can be inserted into the central aperture of the sealing ring 50, thus mechanically joining the two cylindrical members. The clearance tolerance between the inner surface of the cylindrical sleeve 54 and the second cylindrical member is such as to permit a sliding, compressively biased fit between them and also to a moisture-resistant seal.

In an alternative mode of installation, the bushing and sealing ring assembly 1 is installed on the second cylindrical member by inserting the second cylindrical member into the central aperture of the sealing ring 50 and sliding the assembly 1 onto the second cylindrical member to position it. Then, the threaded end portion of the first cylindrical member is inserted into the open end of the bushing 100 and the assembly 1 and first cylindrical member rotated with respect to each other to install the assembly 1 on the first cylindrical member as previously described.

The bushing 100 may be formed of any suitable metal or polymeric material. The sealing ring 50 may be formed of a polymeric material.

Although the invention has been described in terms of specific embodiment of the invention, it should be understood that modifications may be made without departing from the invention, such modifications being considered within the scope of the invention as defined by the claims.

I claim:

1. A bushing and sealing ring assembly comprising
   a. a sealing ring comprising
      i. a cylindrical base provided with an external thread and
      ii. a reduced diameter, upstanding cylindrical sleeve extending co-axially from one end of said base, having a predetermined height, an upper outer edge and an upper inner edge,
      said base and said sleeve being provided with a circular central aperture for receiving and retaining a fist cylindrical member and
   b. a bushing comprising
      i. a cylindrical depending sidewall provided with an internal thread and a circular central aperture for receiving said sealing ring and a second cylindrical member
      ii. a top plate extending transversely partially inwardly into said central aperture to sealingly receive said upper outer edge of said sealing ring and having a predetermined thickness,
   said sealing ring being threadably retainable within said cylindrical sidewall abutting said top plate of said bushing to preassemble said sealing ring with respect to said bushing, said predetermined height of said sleeve is greater than said predetermined thickness of said top plate such that said upper outer edge and said upper inner edge of said sleeve protrude beyond said bushing, and said sleeve adapted for engaging said first cylindrical member.

2. A bushing and sealing ring assembly in accordance with claim 1, wherein said base and said sleeve are integrally formed with each other with said central aperture extending through said base and said sleeve for receiving and retaining said cylindrical member.

3. A bushing and sealing ring assembly in accordance with claim 1, wherein said sleeve comprises a reduced-diameter cylindrical extension of said base that is coaxial with said base.

4. A bushing and sealing ring assembly in accordance with claim 1, wherein said upper outer edge of said sleeve is convexly curved.

5. A bushing and sealing ring assembly in accordance with claim 1, wherein said upper inner edge of said sleeve is convexly curved to facilitate insertion of said first cylindrical member into said aperture in said sealing ring.

6. A bushing and sealing ring assembly in accordance with claim 1, wherein the juncture of said base and said sleeve forms a shoulder having an upper outer edge.

7. A bushing and sealing ring assembly in accordance with claim 6, wherein said upper outer edge of said shoulder is convexly curved.

8. A bushing and sealing ring assembly in accordance with claim 1, wherein said base is provided with at least one pair of diametrically opposed cylindrical recesses in the bottom of the base that extend upwardly in parallel relation to the longitudinal central axis of said sealing ring and the axis of rotation of the sealing ring, said recesses permitting the installation of the sealing ring into the bushing using a driving tool.

9. A bushing and sealing ring assembly in accordance with claim 1 wherein the outside diameter of said sleeve is less than the inside diameter of the central aperture of the bushing.

10. A bushing and sealing ring assembly in accordance with claim 1 wherein said bushing further includes a threaded aperture extending through said side wall.

11. A bushing and sealing ring assembly in accordance with claim 1, wherein said assembly includes a threaded screw threadably disposed in said aperture in said bushing.

12. A bushing and sealing ring assembly in accordance with claim 1, wherein said top plate further having an axial surface and an inner transverse surface, said sleeve of said sealing ring sealingly abuts said axial surface of said top plate and said base of said sealing ring sealingly abuts said inner transverse surface of said top plate.

13. A bushing and sealing ring assembly in accordance with claim 6, wherein the juncture of said base and said sleeve forms a shoulder having an upper outer edge and said top plate further having an axial surface and an inner transverse surface, said shoulder of said sealing ring sealingly abuts said inner transverse surface.

14. A sealing ring adapted for use in a bushing and sealing ring assembly, said bushing having a cylindrical body with internal threading and a first predetermined diameter and a top plate with a central aperture having a second predetermined diameter, said sealing ring comprising
   i. a cylindrical base provided with an external thread adapted for threadable retention in said cylindrical body sealingly abutting said top plate
   ii. a reduced diameter, upstanding cylindrical sleeve extending co-axially from one end of said base having an upper outer edge and an upper inner edge, said base and said sleeve being provided with a circular central aperture for receiving and retaining a first cylindrical member, said upper outer edge and said upper inner edge adapted to extend beyond and abut said central aperture of said top plate.

15. A sealing ring in accordance with claim 14, wherein said base and said sleeve are integrally formed with each other with said central aperture extending through said base and said sleeve for receiving and retaining said cylindrical member.

16. A sealing ring in accordance with claim 14, wherein said sleeve comprises a reduced-diameter cylindrical extension of said base that is coaxial with said base.

17. A sealing ring in accordance with claim 14, wherein said upper outer edge of said sleeve is convexly curved.

18. A sealing ring in accordance with claim 14, wherein said upper inner edge of said sleeve is convexly curved to facilitate insertion of said first cylindrical member into said aperture in said sealing ring.

19. A sealing ring in accordance with claim 14, wherein the juncture of said base and said sleeve forms a shoulder having an upper outer edge.

20. A sealing ring in accordance with claim 19, wherein said upper outer edge of said shoulder is convexly curved.

21. A sealing ring in accordance with claim 14, wherein said base is provided with at least one pair of diametrically opposed cylindrical recesses in the bottom of the base that extend upwardly in parallel relation to the longitudinal central axis of said sealing ring and the axis of rotation of the sealing ring, said recesses permitting the installation of the sealing ring into the bushing using a driving tool.

* * * * *